United States Patent [19]

McIlwain et al.

[11] 4,372,103
[45] Feb. 8, 1983

[54] COMBINE DRIVE BELT SHIELDING

[75] Inventors: Irwin D. McIlwain, Lancaster; James W. McDuffie, New Holland, both of Pa.

[73] Assignee: Sperry Corporation, New Holland, Pa.

[21] Appl. No.: 209,781

[22] Filed: Nov. 24, 1980

[51] Int. Cl.³ .......................................... A01D 14/02
[52] U.S. Cl. ...................................... 56/14.4; 474/146
[58] Field of Search ...................... 56/14.4, 14.5, 14.3, 56/1, 320.1; 474/144, 146, 147

[56] References Cited

U.S. PATENT DOCUMENTS

| | | | |
|---|---|---|---|
| 576,719 | 2/1897 | Bonnell | 474/146 |
| 601,733 | 4/1898 | Phillips | 474/147 |
| 2,614,686 | 10/1952 | Long | 474/146 |
| 2,618,980 | 11/1952 | Cook et al. | 474/146 |
| 3,363,587 | 1/1968 | Harrington et al. | 56/1 |
| 3,577,716 | 5/1971 | McCarty | 56/259 |
| 4,091,602 | 5/1978 | Williams et al. | 56/14.4 |
| 4,139,064 | 2/1979 | Dobberpuhl | 474/146 |
| 4,296,592 | 10/1981 | McIlwain | 56/14.4 |

OTHER PUBLICATIONS

"Massey-Harris", Self-Propelled Combines Brochure, pp. 1-16, 55.

Primary Examiner—Gene Mancene
Assistant Examiner—John J. Wilson
Attorney, Agent, or Firm—Larry W. Miller; Frank A. Seemar; Darrell F. Marquette

[57] ABSTRACT

A crop harvesting header drive mechanism is disclosed wherein a toothed drive belt transfers rotational power from a drive sprocket to a driven sprocket, both of which have indentations around the perimeter thereof to correspond to and engage with the drive belt teeth to provide a positive driving action. Shielding is provided for the return run of the drive belt, wherein the teeth are projecting upwardly, to prevent dirt and/or debris from filling up the interstitial spaces between adjacent drive teeth and disrupting the positive drive relationship between the drive belt and the drive and driven sprockets. The shielding mechanism is pivotally attached at its rearward end to permit the forward end to be vertically movable with the driven sprocket. A detachable L-shaped member is provided to close off a gap formed in the shielding for access to the drive belt.

10 Claims, 5 Drawing Figures

U.S. Patent  Feb. 8, 1983  Sheet 1 of 2  4,372,103
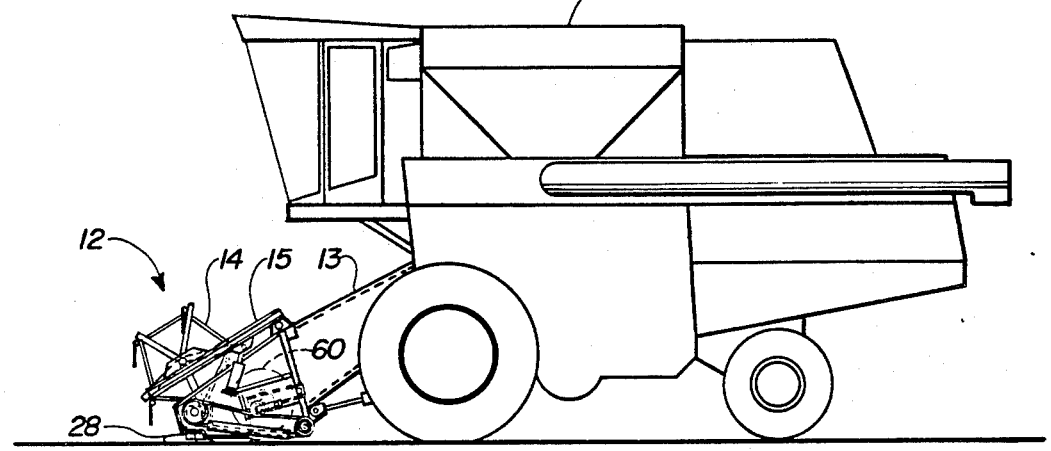
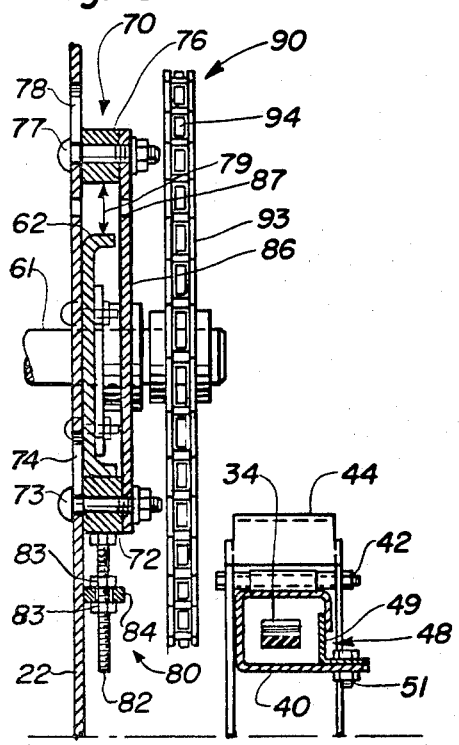
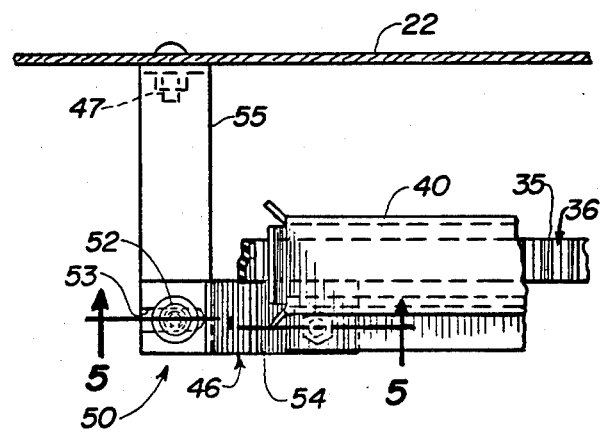
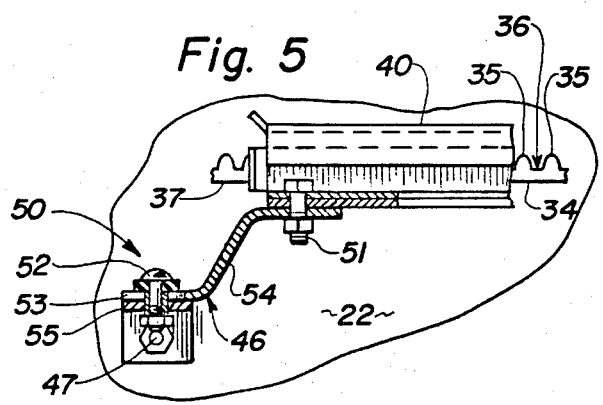

COMBINE DRIVE BELT SHIELDING

BACKGROUND OF THE INVENTION

The present invention relates generally to crop harvesting machines and, more particularly, to shielding for a drive belt having toothed members projecting upwardly during a return run.

Generally, when a split sickle cutterbar, as is more particularly described in U.S. Pat. No. 3,577,716, is provided on a crop harvesting header, it is necessary to maintain proper timing between the opposing sickles. While a common V-belt drive mechanism is generally the least expensive, it does not provide the positive drive relationship necessary between the drive belt and the drive and driven sprockets to maintain the proper timing between opposing sickles.

A chain drive mechanism will provide the proper positive driving relationship between the chain and the drive and driven sprocket; however, a chain drive mechanism is noisy and has a relatively short life as compared to a belt drive. It has been found that a toothed drive belt which engages with a drive and driven sprocket having indentations corresponding to the drive belt teeth provides a proper combination of desirable characteristics and provides a positive drive relationship. However, the return run of such a toothed drive belt positions the teeth in an upwardly projecting position. Therefore, the return run of the drive belt is subject to having dirt and/or debris fill up the interstitial spaces between adjacent drive teeth such that the toothed belt in effect becomes a conveyor until the spaces between the teeth fill up and then operates as a smooth V-belt, thereby, disrupting the positive driving relationship between the toothed belt and the drive and driven sprockets.

Further complicating this problem is the movement of the driven sprocket in a generally vertical direction on flexible headers. If the driven sprocket moves with the corresponding movements of a floating cutterbar, the forward end of the drive belt necessarily moves therewith.

SUMMARY OF THE INVENTION

It is an object of this invention to overcome the aforementioned disadvantages of the prior art by providing shielding over the return run of a toothed drive belt.

It is another object of this invention to provide a mounting with a drive belt shielding that will permit the shielding to move in directions corresponding with the movement of the drive belt.

It is still another object of this invention to provide a mounting bracket having a slotted hole through which the shielding can be connected so as to compensate for changes in distance between the drive sprocket and driven sprocket.

It is a further object of this invention to provide a shielding member that prevents dirt and/or debris from depositing on the toothed side of the drive belt.

It is a further object of this invention to provide a drive belt shielding which has a detachable member to enable the shielding to completely encircle the return run of the drive belt and still have access to the drive belt for servicing and/or repair.

It is a still further object of this invention to provide an inexpensive long life drive means for a split sickle cutterbar that effectively maintains a positive driving relationship between the drive sprocket and the driven sprocket so as to maintain proper timing between opposing sickles.

It is yet a further object of this invention to provide a drive means for a split sickle cutterbar which is durable in construction, inexpensive in manufacture, facile in assemblage, easy to maintain, and durable, simple and effective in use.

These and other objects are accomplished to the instant invention by providing a drive mechanism for a crop harvesting header wherein a toothed drive belt transfers rotational power from a drive sprocket to a driven sprocket, both of which have indentations around the perimeter thereof to correspond to and engage with the drive belt teeth to provide a positive driving action. Shielding is provided for the return run of the drive belt, wherein the teeth are projecting upwardly, to prevent dirt and/or debris from filling up the interstitial spaces between the drive belt and the drive and driven sprockets. The shielding mechanism is pivotally attached at its rearward end to permit the forward end to be vertically movable with the driven sprocket. A detachable L-shaped member is provided to close off a gap formed in the shielding for access to the drive belt.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a side elevational view of a mobile crop harvesting machine, commonly referred to as a combine, incorporating the principles of the instant invention;

FIG. 3 is a cross sectional view showing the auger flotation limit taken along lines 3—3 of FIG. 2;

FIG. 4 is a cross sectional view showing the top of the drive belt shielding adjacent the driven sprocket of the cutterbar drive taken along lines 4—4 of FIG. 2; and FIG. 5 is a cross sectional view showing the mounting of the drive belt shielding adjacent the driven sprocket of the cutterbar drive taken along lines 5—5 of FIG. 4.

DETAILED DESCRIPTION OF THE PREFERRED EMBODIMENT

Figure 2:
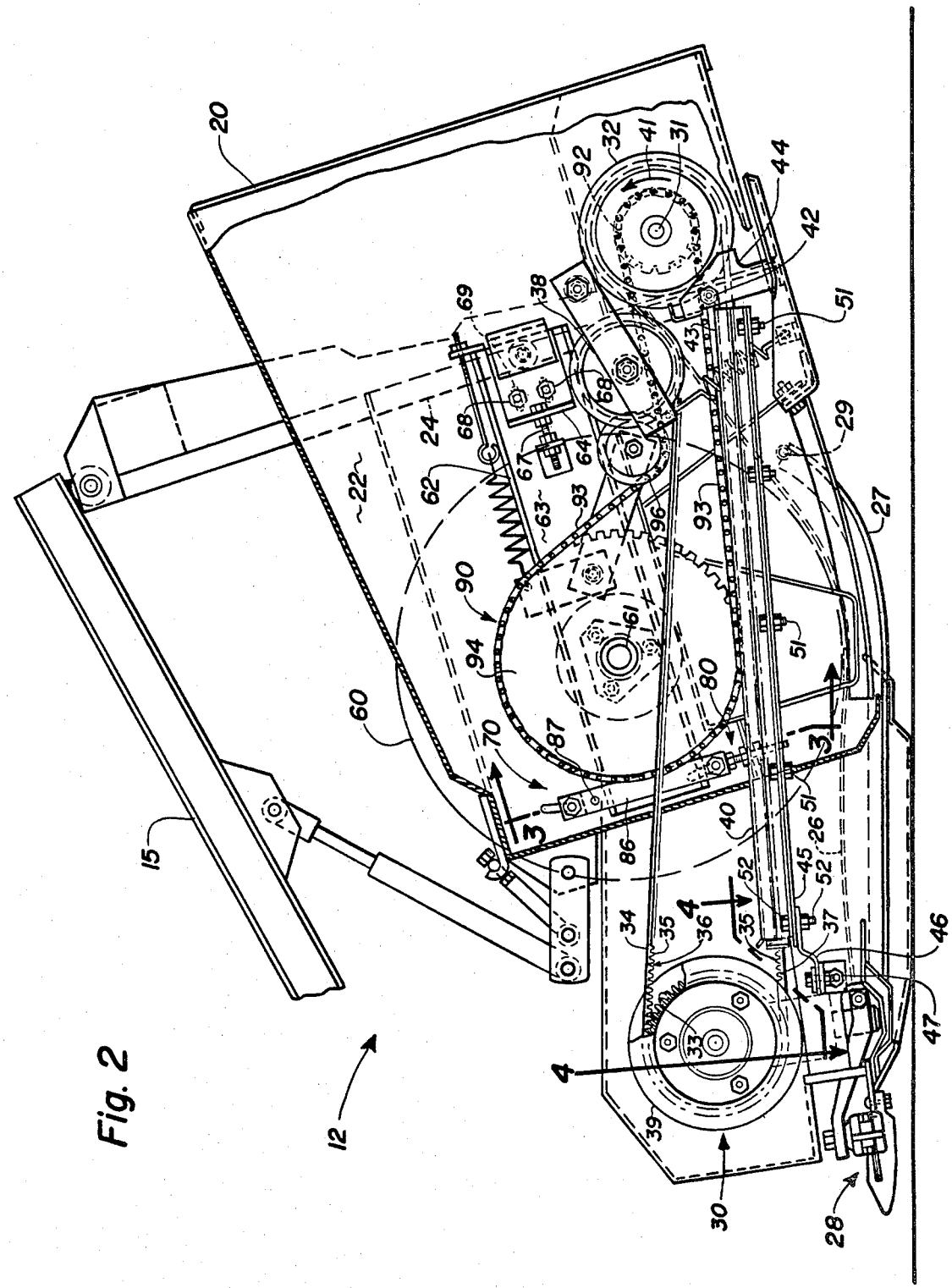
FIG. 2 is an enlarged side elevational view of the header seen in FIG. 1 with the reel removed for clarity.

Referring now to the drawings and, particularly to FIG. 1, a side elevational view of the crop harvesting header attached to the front of a mobile crop harvesting machine can be seen. Left and right references are used as a matter of convenience and are determined by standing at the rear of the machine facing the forward end, the direction of travel. The header 12 is mounted to the forward end of the mobile crop harvesting machine 10 to sever standing crop material and convey it rearwardly through the feeder housing 13 for further harvesting treatment. A reel 14 mounted on reel arms 15 sweeps standing crop material rearwardly over the cutterbar 28, which severs the standing crop, and conveys severed standing crop rearwardly toward the auger 60, which in turn consolidates the crop for discharge through a centrally located opening (not shown) corresponding to the feeder house 13.

Referring now to FIG. 2, an enlarged side elevational view of the header depicting the details of the instant invention can be seen. The header frame 20 supports opposing side sheets 22 positioned in a generally vertical direction parallel to the direction of travel of the mobile crop harvesting machine 10. A rear wall 24 in which the discharge opening (not shown) is located defines the rear of the header 12 between opposing side sheets 22. A floor member 26 positioned substantially horizontally adjacent the ground also extends between opposing sidewalls 22. The header 12 depicted in FIG. 2 is commonly referred to as a flexible header, since a plurality of spaced apart support ribs 27 supporting the cutterbar 28 are pivotally mounted on the frame 20 by pivot 29 such that the cutterbar 28 is free to flex along its transverse length and, therefore, more closely follow the contours of the ground.

Cutterbar Drive Shielding

The drive to the cutterbar is provided by the drive means 30 positioned adjacent each opposing side sheet 22. A drive sprocket 32 is affixed to a power input shaft 31 and transfers rotational power to a driven sprocket 39 through a drive belt 34. For headers 12 utilizing a split sickle cutterbar 28, as more particularly described in U.S. Pat. No. 3,577,716, it is of primary importance that the opposing sickle bars be maintained in proper timing relative to one another to minimize header vibration.

Accordingly, it is of importance to provide a positive means for maintaining this timing. This positive mechanism can be accomplished by providing a drive belt 34 having a plurality of teeth 35 formed into one side thereof with interstitial spaces 36 between adjacent belt teeth 35. These belt teeth 35 are engageable with corresponding indentations 33 spaced around the perimeter of both the drive sprocket 32 and the driven sprocket 39. The positive gripping action between the belt teeth 35 and the sprocket indentations 33 provides the positive driving action to maintain proper timing.

On the return run 37 of the drive belt 34 between the driven sprocket 39 and the drive sprocket 32, the teeth 35 project in an upward direction. The working environment of the crop harvesting machine 10 is such that the return run 37 is subject to having the interstitial spaces 36 filled with dirt and/or debris falling downwardly thereon. If the interstitial spaces 36 become filled with dirt and/or debris, the teeth 35 cannot positively engage with the corresponding indentations 33. The result is that the positive driving action is lost and proper timing between opposing sickles becomes disrupted. To eliminate this problem a drive belt shielding 40 is provided to prevent dirt and/or debris from falling on the return run 37 of the drive belt 34.

Because the driven sprocket 39 is mounted so as to flex with the cutterbar 28, the driven sprocket 39 is movable in a generally vertical direction relative to the drive sprocket 32. Proper tension is maintained in drive belt 34 by a spring loaded tensioning sprocket 38. The drive belt shielding 40 is mounted to move corresponding to the movements of the driven sprocket 39. The shielding 40 is pivotally attached at its rearward end 43 to a vertical shield member 44 by a pivot 42. The vertical shield 44 cooperates with the rearward end 43 of the shield 40 to prevent dirt and/or debris from being drawn into the drive sprocket 32, due to the rotation thereof in the direction indicated by the arrow 41, and is fixedly mounted to the side sheet 22. The forward end 45 of the shielding 40 is mounted through bracket 46 and connecting bolt 47 with the drive means 30 for vertical movement with the cutterbar 28 and driven sprocket 39.

As can be seen in FIGS. 4 and 5, to compensate for the changes in length between the driven sprocket 39 and the drive sprocket 32 due to the vertical movement of the driven sprocket 39, the elongated forward end 45 of the shielding 40 includes a sliding means 50. More specifically, the mounting bracket 46 includes a first leg 54 attached to the forward end 45 of the shielding 40 and a second leg 55 attached to the side sheet 22. The first leg 54 is slidably connected to the second leg 55 by a connecting bolt 52 positioned within a slotted opening 53 in the first leg 54 so that the forward end 45 can move toward or away from the driven sprocket 39. To facilitate the sliding movement between the first leg 54 and the second leg 55, a washer 56 and a spacer 57 are provided with the connecting bolt 52. One skilled in the art should realize that a telescoping mechanism built into the shielding 40 would also function as a sliding means 50 to compensate for the changes in length between the drive sprocket 39 and the driven sprocket 32.

Referring now to FIGS. 2, 3 and 4, it can be seen that the cross sectional configuration of the shielding 44 is generally tube-like such that it substantially encircles the drive belt 34. This configuration prevents contamination of the drive belt 34 by dirt and/or debris coming from below the shielding 40. To insert or remove the drive belt 34 from within the shielding 40, an L-shaped member 49 closes off a gap 48 through which the drive belt 34 may pass. The L-shaped member 49 is detachably affixed to the shielding 40 by connecting bolts 51 to provide readily accessible service to the drive belt 34. One skilled in the art should realize that the forward end 45 of the shielding 40 can be spaced somewhat from the driven sprocket 39 due to the rotation of the drive means 30 indicated by the arrow 41 tending to prevent dirt and/or debris from accumulating adjacent the driven sprocket 39.

Auger Flotation

The auger 60 is operable to consolidate severed crop material delivered rearwardly thereto by the reel 14 for discharge through the crop discharge opening (not shown) in the rear wall 24 of the header 12 to the feeder house 13 for further harvesting treatment by the mobile crop harvesting machine 10. As is seen in FIGS. 2 and 3, the auger 60 includes a shaft 61 rotatably mounted in support arm 62 adjacent each opposing side sheet 22. The support arm 62 is of a two piece construction including a forward member 63 and a mounting bracket 64.

The forward member 63 is selectively slidably affixed to the mounting bracket 64 by connecting bolts 68 fitted through slotted holes 69 in the forward member 63. A draw bolt 67 interconnecting the forward member 63 and the mounting bracket 64 serves as an adjusting mechanism to selectively move the forward member 63 in a fore-and-aft direction and, thereby, adjust the position of the auger 60 relative to the rear wall 24. Since the support arm 62 is pivotally mounted on the frame 20 by a pivot 65 connected to the mounting bracket 64, the auger 60 is capable of generally vertical movement relative to the floor member 26. This vertical movement of the auger is generally referred to as "float". To limit the amount of vertical movement permitted to the auger 60, a limit means 70 is provided.

A first, lower stop 72 is connected to the side sheet 22 by the connecting bolt 73 through a slotted hole 74 below the forward member 63 of the support arm 62. The position of the lower stop 72 determines the lower limit of vertical movement of the support arm 62 and, therefore, the auger 60. During normal operation, the forward end 63 of the support arm 62 will rest on the lower stop 72. A second, upper stop 76 is affixed to the side sheet 22 by a connecting bolt 77 extending through a slotted hole 78 above the forward end 63 of the support arm 62. The distance indicated by the arrow 79 between the forward end 63 of the support arm 62 and the upper stop 76 is the amount of flotational movement permitted to the auger 60 since the upper stop 76 defines the upper limit of movement of the support arm 62.

To selectively position the lower stop 72 and, thereby, fix the minimum distance between the auger 60 and floor member 26, a vertical adjusting means 80 is provided. As is seen in FIG. 3, the adjusting means 80 includes a bolt 82 extending through a horizontal extension 84 of the side sheet 22 which can be locked into a selected position by nuts 83 engaged with the bolt 82 on either side of the extension 84. Manipulation of the nuts 83 and the bolt 82 will vertically position the stop 72 within the limits defined by the slot shaped hole 74. A strap member 86, interconnecting the lower stop 72 and the upper stop 76, transfers vertical movement asserted against the lower stop 72 to the upper stop 76 so that the upper stop 76 moves the same distance as the lower stop 72. Accordingly, manipulation of the adjusting means 80 to vary the minimum distance between the auger 60 and the floor member 26, will not effect the amount of flotational movement 79 permitted to the auger 60; therefore, the capability of the auger 60 to smooth out slugs of severed crop material is not affected by a lessening of the amount of "float". By providing a plurality of holes 87 in the strap member 86, the amount of flotational movement 79 is permitted to the auger 60 can be selectively varied. By positioning the upper stop 76 directly adjacent the support arm 62 at the same time the lower stop 72 is adjacent the support arm 62, the floating auger can be optionally converted into a rigid, fixed auger that can still be adjusted relative to crop conditions.

As can be seen in FIGS. 2 and 3, the auger 60 is driven through an auger drive means 90 having a drive sprocket 92 affixed to the power input shaft 31 concentric with the drive sprocket 32, that transfers rotational power via a drive chain 93 to a driven sprocket 94 affixed to the auger shaft 61. To accommodate changes in distance between the auger shaft 61 and the power input shaft 31 during flotational movement of the auger 60, a spring loaded tensioning sprocket 96 is provided to maintain the proper tension in the chain 93.

It will be understood that various changes in the details, material, steps and arrangement of parts which have been described and illustrated to explain the nature of the invention, will occur to and may be made by those skilled in the art upon a reading of the disclosure within the principles and scope of the invention. The foregoing description illustrates preferred embodiment of the invention. However, concepts, as based upon such description, may be employed in other embodiments without departing from the scope of the invention. Accordingly, the following claims are intended to protect the invention broadly as well as in the specific form shown herein.

Having thus described the invention, what is claimed is:

1. A crop harvesting header forwardly attached to a mobile crop harvesting machine, in combination, comprising:

a frame including opposing, substantially vertically inclined first and second sidewalls aligned substantially parallel to the forward direction of travel of said crop harvesting machine;

a cutterbar mounted forwardly on said frame transverse to said direction of travel between said sidewalls to sever standing crop material, said cutterbar having two reciprocable sickle assemblies, each said sickle assembly being positioned adjacent one of said sidewalls and extending substantially halfway across said header toward the other said sickle assembly, said sickle assemblies being reciprocably operable in a timed counter-stroking relationship;

drive means mounted on each said sidewall for respectively reciprocating the adjacent said sickle assembly, each said drive means including a drive sprocket, a driven sprocket mounted for movement relative to said drive sprocket, a drive belt drivingly entrained between said drive sprocket and said driven sprocket and a tensioning means engaged with said drive belt to maintain tension therein during the movement of said driven sprocket relative to said drive sprocket, each said drive belt having a plurality of teeth on one side thereof with an interstitial space between adjacent teeth, said teeth drivingly cooperating with corresponding indentations in said drive sprockets and said driven sprockets to provide a timed relationship between each corresponding said drive sprocket and said driven sprocket such that said timed counter-stroking relationship between said sickle assemblies can be positively maintained, each said drive belt being entrained about the corresponding said drive sprocket and said driven sprocket such that at least one portion of each said drive belt is positioned with said teeth projecting upwardly, whereby said interstitial spaces are subject to being filled with extraneous dirt and debris; and shielding means mounted on each said sidewall adjacent to and above the respective said at least one portion of each said drive belt for preventing extraneous dirt and debris from falling onto the respective said at least one portion of each said drive belt and filling up said interstitial spaces, such that the timed relationship between each said sickle assemblies will not be disrupted due to said drive belt teeth not being able to engage said sprocket indentations, each said shielding means including sliding means for compensating for changes in length between the corresponding said drive sprocket and said driven sprocket due to the movement of the driven sprocket relative to the respective drive sprocket.

2. The crop harvesting header of claim 1 wherein each said sliding means includes a first member mounted on said frame for movement with said driven sprocket and a second member slidingly connected to said first member for relative movement therebetween, said second member being affixed to said shielding means such that said driven sprocket is movable relative to said shielding means in a fore-and-aft direction.

3. The crop harvesting header of claim 2 wherein each said shielding means includes a elongated tube-like member having a first end adjacent the respective said drive sprocket, a second end adjacent the respective said driven sprocket and a passageway therethrough extending between said first end and said second end, said at least one portion of each said drive belt being operatively positioned within the respective said passageway.

4. The crop harvesting header of claim 3 wherein the first end of each respective said tube-like member is pivotally mounted on said frame, the second end of each respective said tube-like member being connected to said second member of said sliding means for movement with the corresponding said driven sprocket such that said second end of said tube-like member is vertically movable with said driven sprocket and said drive belt.

5. In a drive mechanism mounted on the frame of a crop harvesting machine for transferring rotational power from a drive sprocket having a first axis of rotation to a driven sprocket having a second axis of rotation, said driven sprocket being mounted on said frame for movement relative to said drive sprocket, both said drive sprocket and said driven sprocket further having a plurality of indentations spaced around the respective axis of rotation, said drive mechanism having a drive belt entrained around said drive sprocket and said driven sprocket, said drive belt having a plurality of teeth thereon corresponding to said indentations, said teeth and said indentations being cooperable to prevent relative movement between the respective said sprocket and that portion of said drive belt engaged therewith so as to maintain a timed relationship between said drive sprocket and said driven sprocket during operation of said drive mechanism, said teeth being located on one side of said drive belt with interstitial spaces therebetween, said drive belt being entrained about said drive sprocket and said driven sprocket in such a manner as to have a return run wherein said teeth are directed upwardly, the improvement comprising:

shielding means mounted on said frame adjacent to and immediately above said return run of said drive belt for preventing dirt and debris from falling onto said drive belt and filling up said interstitial spaces, which, if not prevented, would impede the cooperation between said teeth and said indentations and disrupt the timed relationship between said drive sprocket and said driven sprocket, said shielding means being pivotally mounted to said frame adjacent said drive sprocket and movable with said driven sprocket about said pivot.

6. The drive mechanism of claim 5 wherein said shielding means includes an elongated member having a first end pivotally mounted on said frame adjacent said drive sprocket and a second end adjacent said driven sprocket and movable therewith, said elongated member forming a passageway extending between said first end and said second end, said return run of said drive belt operatively passing within said passageway.

7. The drive mechanism of claim 6 wherein said drive mechanism further includes a spring loaded idler sprocket engaged with said belt to maintain a proper tension in said drive belt during movement of said driven sprocket such that the driving relationship between said drive belt and said sprockets is maintained.

8. The drive mechanism of claim 7 wherein said elongated member has a tube-like configuration, substantially rectangular in cross-section, forming a passageway therethrough substantially completely encircling said return run of said drive belt.

9. The drive mechanism of claim 7 wherein said elongated member includes a sliding means for compensating for changes in length between said drive sprocket and said driven sprocket during movement of said driven sprocket.

10. The drive mechanism of claim 10 wherein said sliding means comprises an L-shaped bracket having first and second legs, said first leg being affixed to said elongated member and projecting forwardly therefrom toward said driven sprocket, said second leg being mounted on said frame for movement with said driven sprocket, said first leg being slidably connected to said second leg for movement thereof relative to said driven sprocket.

* * * * *